United States Patent [19]

Olsen, Jr.

[11] Patent Number: 5,061,553
[45] Date of Patent: Oct. 29, 1991

[54] COEXTRUDED SAIL

[76] Inventor: Kenneth F. Olsen, Jr., Box 2026, Dennis, Mass. 02638

[21] Appl. No.: 321,895

[22] Filed: Mar. 10, 1989

Related U.S. Application Data

[63] Continuation of Ser. No. 155,356, Feb. 12, 1988, abandoned, which is a continuation-in-part of Ser. No. 75,584, Jul. 20, 1987, abandoned, which is a continuation-in-part of Ser. No. 18,412, Feb. 25, 1987, abandoned.

[51] Int. Cl.$^5$ .................. B32B 27/36; B29C 47/00; B63B 35/00
[52] U.S. Cl. ................... 428/215; 428/412; 428/476.1; 428/516; 428/910; 428/483; 428/476.3; 114/39.1; 264/176.1; 264/210.7
[58] Field of Search ............. 428/412, 215, 476.1, 428/516

[56] References Cited

U.S. PATENT DOCUMENTS 4,407,877 10/1983 Rasmussen .................. 428/905 X

Primary Examiner—P. C. Sluby
Attorney, Agent, or Firm—Richard P. Crowley

[57] ABSTRACT

A sail material and method of manufacture of such sail material, the sail material being made of a plurality of polymers coextruded in coextensive layers (12, 14, 16, 18, 20), each of a dissimilar polymer forming a continuous sheet and each of such polymers having different physical/mechanical properties from one another which, when combined in such sheet, impart beneficial properties to the sail material.

22 Claims, 1 Drawing Sheet

COEXTRUDED SAIL

REFERENCE TO PRIOR APPLICATIONS

This application is a continuation of U.S. patent application Ser. No. 07/155,356, filed Feb. 12, 1988, now abandoned which application is a continuation-in-part of U.S. patent application Ser. No. 07/075,584, filed July 20, 1987 (now abandoned), which U.S. patent application is a continuation-in-part of U.S. patent application Ser. No. 07/018,412, filed Feb. 25, 1987 now abandoned.

BACKGROUND OF THE INVENTION

This invention relates to sails composed of coextruded rail material, and more particularly, relates to a unitary-formed, coextruded, high performance, non-laminated sails.

DESCRIPTION OF THE PRIOR ART

Sail materials in the past traditionally have been made from cotton and other natural fibers. More modern, high performance sailcloth has been made from woven synthetic fibers such as Dacron ®, Kevlar ® or nylon, much of which sail material is conventionally woven as a cloth and then finished, scoured and treated with various types of resins to give such cloth stiffness and stability. This finished product is provided in rolls to make sails. In the most modern of such sail materials, a laminate, such as a Mylar ® film (a trademark of E. I. DuPont de Nemours & Co. for a polyester polymer) is laminated to the cloth, creating a sail material having a very high strength to weight ratio. This sail material is more stable to directional stress, yet possesses sufficient durability to withstand exposure to the ocean environment while under wind load. Such laminates are an important improvement over predecessor materials. Some of these products use Kevlar ® (a trademark of E. I. DuPont de Nemours & Co. for a aromatic polyamide polymer fiber) or polyester reinforcement threads sandwiched between the cloth and the film giving the final product excellent strength in the direction of the thread line, while the laminated Mylar ® film imparts more strength and stability on the bias.

It is important to appreciate that woven sailcloth construction has good strength in the warp and fill directions, but such materials are very weak on the bias because its woven thread structure can be pulled apart under pressure. Modern weaves tend to lessen this weakness, but fabrics are still weaker when pulled along their bias. The use of biaxially-oriented plastic films, such as Mylar ®, for example, which are laminated to said cloth, enhances the total strength of the sail material because such films have strength in more than one direction. They also increases the stability of the fabric, but problems have occurred with these new laminated materials. One problem associated with laminated materials is their tendency to delaminate if they are under stress or if they become folded or creased. Also, the use of such laminates creates high percentages of fabric waste due to the construction techniques utilized in manufacturing sails therefrom because of its directional nature. Another disadvantage of laminates is their rather short-term durability and relatively high cost.

Today, many of such products have extremely low quality control standards also creating waste. As mentioned, the sail material strength, even when laminated, is highest on the thread lines and weakest on the bias, and there still is a percentage of undesirable stretching even when using said plastic laminated fabrics. The fact that sail material is stronger on the thread line than on the bias requires a sail maker to orient the sail material in sections forming complex patterns to create sails of various designs, such as the crosscut sail, the box cut sail, the tri-radial sail and other examples well known in the sail making art. Sails of complex structure are expensive to manufacture because of the high labor costs involved in construction and because of the great waste of materials due to cutting shapes out of materials which must be oriented in particular directions to form the large number of panels which have to be sewn together to handle the expected stresses in the sails. The large number of pieces within each sail enhances the likelihood of shape and alignment errors, and faulty workmanship can easily occur, causing weak points and poor shape. Such sails, as mentioned above, will shrink with age due to microdelaminations caused by folds and creases which eventually can lead to as much as a two percent (2%) reduction in size because of such shrinkage. It should be noted that these modern fabrics will also lose strength when repeatedly folded and creased. As the laminates delaminate and resin fabric coatings deteriorate, the life expectancy of the sail shortens.

Current sail materials absorb a great deal of water in use, often amounting to many times the original weight of the sail. Wet sails, which add further weight to the mast and to the entire structure of the sailboat, are undesirable. Also saltwater from the ocean, dirt and other naturally occurring substances tend to break down the materials used in today's sails. These sails, after exposure to sun and the elements, tend to get brittle, weak and hard to handle. This condition is especially true when stronger, and hence thicker, sail material is necessary. Such brittle sails feel like sheet metal when they are utilized and do not have a soft "hand". Laminated sails of the prior art are frequently extremely heavy and stiff to utilize and as mentioned above, are frequently of low quality, crookedly woven, discolored and misshapen. Prior art cloth with unreliable and uneven strength across its surface results in portions of such material being discarded as unusable. This unreliable quality is due to the fact that weaving technology today is not aimed at producing extremely high quality products for the sail making industry.

SUMMARY OF THE INVENTION

The invention relates to coextruded sails and a method of preparing sails composed of a coextruded polymeric sail material.

The coextruded sail comprises two or more coextruded layers of different polymers at least one essential polymer comprising a polyamide polymer, such as nylon, like nylon 6, to impart wind resistance to the sail and another polymer to impart strength and/or rigidity to the sail. The polyamide polymer extruded layer is employed in combination with a liquid crystal polymer extruded layer or a polycarbonate or polycarbonate-liquid crystal polymer combination or admixture extruded layer for strength and for sail rigidity. The extruded layers may be adjacent one another or separated and may comprise more than one layer of the sail. Optional other extruded polymer layer composed of other polymer, such as extruded poly olefin or thermoplastic extruded urethane layers may be used, such as a linear, low density polyethylene to contribute other properties, such as a soft hand feel to the sail. The coextruded polymer layer may be optional or may be required to be secured together to form a unitary composite sail by the use of an adhesive tie layer coated on the extruded polymer layers.

It is one object of the invention to utilize the process of coextrusion to combine dissimilar polymers into a sail which polymers include a polyamide polymer layer, like nylon, and a polycarbonate polymer or liquid crystal polymer layer into a unitary, composite, planar structure having a plurality of layers. Each of the coextruded polymers impart a desired characteristic to create a sail material of excellent properties to form a sail for wind-propelled devices, such as sailboats.

It is to be appreciated that various polymers have different characteristics. Some polymers may have very high tensile strength while others may possess high impact strength, high modulus of elasticity, toughness, low elongation features, flexular strength, impact resistance, soft feel, dimensional stability, high tensile modulus and other properties which are desirable in sail material. The parameters of any individual material preclude any single polymer from being an effective sail material. It is only when a plurality of such polymers are coextruded together that the sail of the invention is created incorporating a plurality of highly desirable features.

It should be noted that one of the most important qualities of a sail is to be light, i.e. have a high ration of surface area to weight. Many polymeric materials which have desirable physical and mechanical properties that would be desirable in sail material cannot presently be fabricated or handled in a way to incorporate them into sail material as they are not practical to laminate in a thin layer for a laminate construction. They lack properties to allow their combination into a proper thinness to create a sail of a practical dimension in thickness. However, utilizing modern coextrusion techniques, one can combine many such dissimilar polymers into a multilayered composite which can have as few as three or more layers, as thin as 0.0002 inches. Presently a maximum of nine layers is possible, but the number of layers is only limited by practical need, and technological advances and more layers could be utilized. It has been found desirable in one structure to incorporate at least three layers of different materials coextruded together where at least one layer is to provide the tensile strength and stiffness; another layer, the impact resistance; and yet another layer, the soft feel of the material. Further layers can provide, for example, properties of color, ultraviolet light protection, textures, thermal properties, etc.

One sail for use with wind-powered, such as sailboats, wind surfers, yachts, iceboats and the like, comprises a unitary, composite, planar sail material, the sail material having a plurality of coextruded polymer layers, coextruded and secured together on coextruding or, optionally, containing adhesive tie layers therebetween as required to form a continuous sheet. One of said layers comprises a polyamide polymer, such as a nylon 6/6, to impart high wind impact resistance to the sail, and another of said layers comprising a polycarbonate polymer layer or liquid crystal polymer layer or a polyamide-polycarbonate-containing layer to impart high strength and rigidity to the sail. Typically, where the polycarbonate or liquid crystal polymer and polyamide layers are coextensive, an adhesive tie layer, such as a polyolefin, for example, a polyethylene-based or other compatible adhesive, is required to adhere dissimilar extruded polymers, such as the polycarbonate to the nylon layer.

The sail may comprise a number of polymer layers containing both polyamides, liquid crystal polymers and polycarbonates and other extruded polymer layers in various combinations to include polyethylene and polypropylene layers. For example, one sail would comprise a linear, low density polyethylene layer, a tie adhesive layer a nylon-6/6 layer, a tie adhesive layer and a polycarbonate layer to provide a sail having good feel properties based on the polyethylene, high wind impact resistance based on the nylon and strength and rigidity based on the polycarbonate layer. Another sail would comprise a sail composed of nylon layer, a tie adhesive layer, a polycarbonate layer, a tie adhesive layer and a nylon layer. A further sail would comprise a linear low density polyethylene layer; a nylon layer, such as a nylon-6/6 layer; and a liquid crystal polymer mixed with a polycarbonate only to provide additional strength and rigidity. The coextruded layers preferably are arranged in a symmetrical structure, such as, for example, A/B/C/B/A or A/B/A, whereas each letter, A, B and C, represents a different extruded polymer layer.

One typical sail material comprises an LLDPE-TIE-Nylon 6-TIE-LCP where the LLDPE, a linear, low density polyethylene, contributes the soft feel without sacrificing strength, the nylon 6 contributes wind impact resistance, and the liquid crystal polymer imparts high strength. Such coextruded and stretched material can be used to construct a sail without regard to material orientation, at a great savings in labor and material over the prior art.

The polyamide polymer layer employed typically comprises a nylon-6/6, but other polyamide polymers may be employed as the extruded polyamide layer. The polycarbonate polymer layer may be employed alone or, typically, in combination with other polymers, for example, liquid crystal polymers. Liquid crystal polymers are desirable polymers as they form highly oriented crystal polymer chains when subject to shear in the melt phase. However, liquid crystal polymers tend to be quite expensive. Liquid crystal polymers may be used as an extruded polymer layer alone or with other polymers as one of the coextruded polymer layers.

It is often desirable for economic reasons to provide mixtures of liquid crystal polymers with polycarbonates to reduce the cost of the polycarbonate-containing polymer layer. The amount of liquid crystal polymer admixed with the polycarbonate may vary as desired, but typically may range from 5% to 95%, for example, 40% to 70% by weight. The mechanical properties of liquid crystal polymers would range, for example, from a flex modulus of 2.4 million psi or more, a tensile strength of 20,000 psi or more, and a heat deflection temperature at 264 psi of 400° F., or more. Liquid crystal polymers for use in the sails would comprise, but not be limited to, copolymers of para-oxybenzoyl units and oxybiphenylene terephthaloyl monomers which are thermotropic. Another class of liquid crystal polymers are aromatic polyesters and are usually characterized by a slightly lower melting point than the oxybenzoyl biphenylene polymers, terephthalate polymers and have a lower heat deflection temperature, for example, 335° F.-355° F. at 264 psi. The polyester-based liquid crystal polymer contains an ester grouping. However, liquid crystal polymers may include azomethines and olefin-based polymers.

Where layers are coextruded and the polymers are very dissimilar in their polar properties, an adhesive tie layer is often required or necessary, such as, for example, usually between the polycarbonate polymer layer and a nylon-6/6 polymer layer. Any adhesively effective adhesive material may be used as a tie layer. The polymers employed in the polymer layers may contain various additives, such as antioxidants, dyes fibers, fiber reinforcement additives, plasticizers, coloring agents, stabilizers, and other conventional additives to impart specific properties to such polymer layers. It is desirable to provide for adjacent layers of the polyamide, such as nylon-6/6 and the polycarbonate, or the liquid crystal polymer-containing polycarbonate layers. Such layers may be separated by other dissimilar polymer layers.

The finished product can be fabricated in different ways, for example, first, by directly coextruding a film comprised of individual layers, either by bloom film method or cast film (chill roll) methods known in the art with the total thickness of the finished product in this case in the range of 0.0005–0.015 inches. Secondly, the product can be extruded with the individual polymers into a sheet of thicker material such as 0.01–0.1 inches and subsequently biaxially stretching the sheet to the final thickness of 0.0005–0.015 inches. This biaxial orientation further imparts biaxial strength to the film and reduces overall elongation.

The invention will be described for the purposes of illustration only in connection with certain embodiments; however, it is recognized that various changes, additions and improvements can be made by those persons skilled in the art, all falling within the spirit and scope of the invention.

DESCRIPTION OF THE EMBODIMENTS

Figure 2:
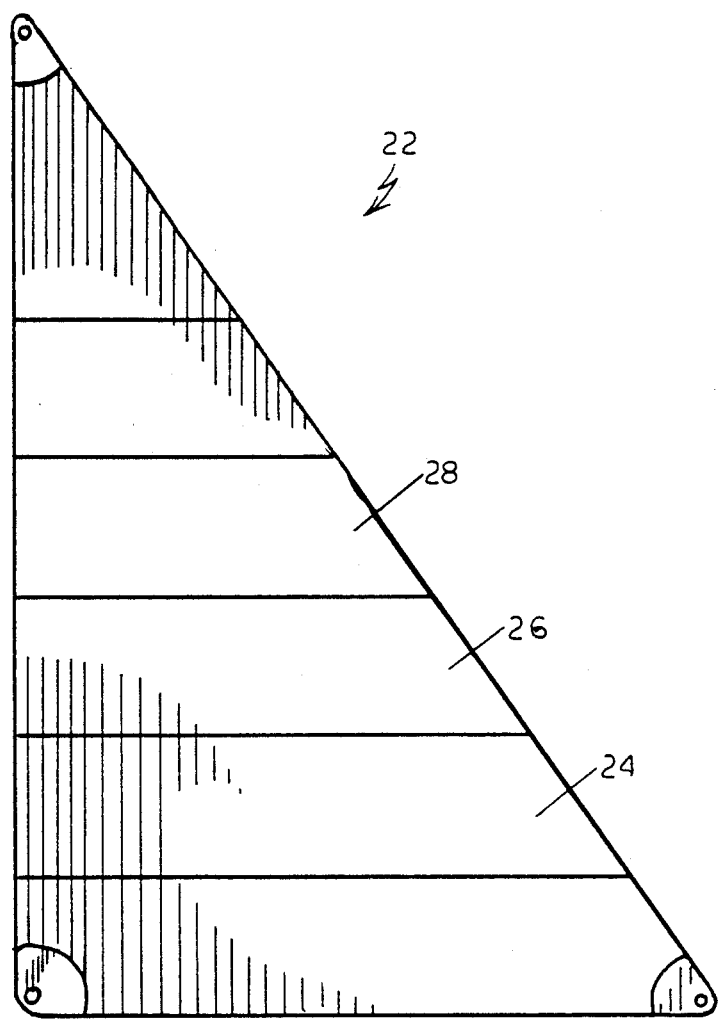
FIG. 2 illustrates a plan view of the sail of the invention made from coextruded materials.

The sail is comprised of polymer materials coextruded in distinct layers in thicknesses of, for example, at about 0.0005 to 0.015 inches. These sail structures are either stronger or equivalent in strength to materials made by the prior art, weigh approximately one-quarter to one-third as much as the prior art, which decrease in weight is a great advantage. The structure of this material, which is coextruded and possibly stretched biaxially, will have equivalent strength in all planar directions unlike prior art materials. Sails can thus be made in a simple and economical fashion such as seen in FIG. 2. The materials are provided in rolls of the width of sheet 24 and joined at the seams to the next sheet of sail of the same width. The wider the roll of material, within practical limits, the fewer number of seams 26 that would be necessary to create sail 22. The number of seams illustrated in FIG. 2 is only indicative of a particular sheet width, and if a wider width were used, fewer seams would be necessary. This is an important difference from the prior art where panel orientation and load maps are necessary to make the strongest and lightest sail. This material will also allow sail makers to create new heretofore unused designs for sails since they will be using material which is nondirectional in strength.

The nonlaminated, nonwoven, coextruded sail material can be utilized alone without the use of woven or nonwoven fibers to impart strength since its strength is imparted by one or more of the various polymer layers of the invention. Some of sail material will have certain laminate-like qualities, such as low bias stretching, but they will be lighter in weight and contain all the positive qualities without the negative aspects of delamination or microdelamination as can occur in the laminated sail material of the prior art. Further, the coextruded sail material will not lose strength after folding and, depending upon its construction, will absorb less than two-tenths of 1% of its weight in water, which will cause an important weight reduction in the boat's sails high above the deck where the extra weight of water absorbed into prior art sails decreases the stability of the boat significantly. When ultraviolet light-protective layers are utilized, sunlight will not break down the sail material of the invention as it does in current sail materials, almost all of which are sensitive to ultraviolet light. Further, the coextruded sail material of the invention will resist salt water, dirt and other foreign matter because it is a sealed film formed as one unitary structure and not separately formed by layering or weaving, or both, which will allow crevices to hold dirt.

The coextruded film of the invention also allows changes to its visual and tactile qualities without affecting its strength by coloring layers or creating layers of various textures on its outer surfaces. Such coextruded films allow for the incorporation in the sail material of suitable texture or feel, referred to as "hand" by sail makers. The ability to determine the softness or brittleness of the sail material and to combine high tensile strength with a good feel or "hand" is highly desirable. Prior art woven structures are often impregnated with hard resins to improve bias strength, but such impregnation makes the cloth behave like sheet metal.

If the characteristic of strength is desired, the sail material of the invention can be provided with ingredients that have good "memory" or recovery of their shape. If, though, the film is heated and stretched in processing, the polymers align and temper, which leads to a higher strength material. Conversely, by utilizing unstretched film, when it is stretched in use, it will rebound to its original shape better while providing the stretch needed and desired for a particular sail. This is accomplished by regulating the type of polymers and the arrangement of layers utilized and the amount of biaxial stretching. It is felt, though, that the greatest advantage of the sail material of the invention is the use of nonstretch films which will create sails that will not change shape during use since changes in a sail's shape occurring while a sail is in use slows down the boat on which it is installed.

Figure 1:
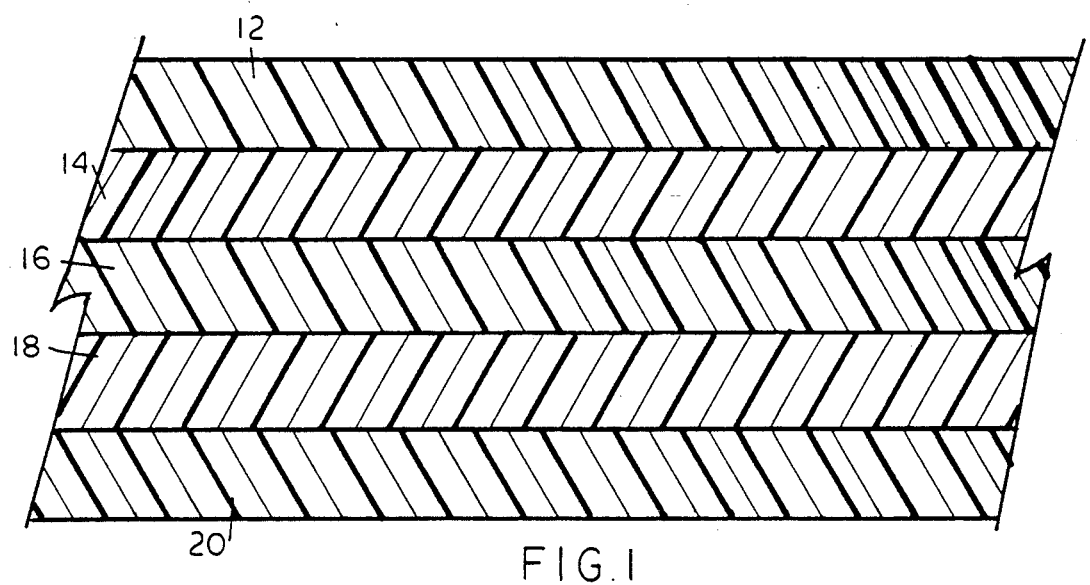
FIG. 1 illustrates a cross-sectional view through the coextruded sail of the invention showing multiple layers thereof.

The coextruded, multilayered films of the invention can be manufactured to extremely high tolerances and quality, and the use of such material for sails will cut down markedly on the waste of material found in the prior art which is prone to quality problems. FIG. 1 illustrates a plurality of extruded polymer layers 12, 14, 16, 18 and 20, but it should be appreciated that a variety of materials and different numbers of layers, such as discussed above, could be utilized. As mentioned above, a typical sail material of the invention can be an LLDPE or LDPE layer 12, a tie adhesive layer 14, a nylon-6/6 layer 16, a tie adhesive layer 18 and a polycarbonate polymer layer or a liquid crystal polymer or polycarbonate-liquid crystal polymer layer 20. The LLDPE, a linear low density polyethylene layer, contributes the soft feel without sacrificing strength, the nylon-6/6 material contributes impact resistance, and the polycarbonate or liquid crystal polymer-containing layer imparts high strength. A suitable polycarbonate polymer layer may be comprised of Lexan ® 144-111 (Lexan ® is a trademark of General Electric Co., Polymers Product Department, for thermoplastic carbonate-linked polymers prepared by reacting bisphenol A and phosgene, e.g. a linear polyester of carbonic acid).

A suitable liquid crystal polymer for use with the polycarbonate polymer or as a separate layer comprises Vectra ® A900 (a trademark of Celanese Chemical Company for a polypropylene fiber). A suitable nylon polymer layer comprises a thermoplastic nylon, such as nylon-6 or Capran ® IS Nylon-6 8207F Nylon (a trademark of Allied Chemical Corp.). Where the polycarbonate Lexan ® layer and Capran ® layer are adjacent, extruded layers, an adhesive tie layer is usually employed, such as an olefin-based adhesive Admer AT469C (a trademark of Archer-Daniels Midland Company). The materials listed here are as examples only, and other materials not specifically mentioned herein could be coextruded to form the sail material of the invention.

Although the present invention has been described with reference to particular embodiments, it will be apparent to those skilled in the art that variations and modifications can be substituted therefore without departing from the principles and spirit of the invention.

What is claimed is:

1. A sail for use with wind-powered devices, which sail comprises a unitary, composite formed of a plurality of sheets, generally triangular, planar sail material, the sail material having a plurality of coextruded polymer layers secured together, one of said extruded polymer layers comprising a polyamide polymer to impart impact-resistant properties to the sail and another of said polymer layers selected from the group consisting of: a polycarbonate polymer; a liquid crystal polymer; and a polycarbonate-containing polymer layer to impart strength and rigidity to the sail.

2. The sail of claim 1 wherein the sail comprises three polymer layers, each polymer layer composed of different polymer materials and coextruded together.

3. The sail of claim 1 wherein the polymer layers are biaxially stretched polymeric layers.

4. The sail of claim 1 which includes a linear, low density polyethylene layer.

5. The sail of claim 1 wherein the polycarbonate-containing polymer layer comprises an admixed polycarbonate-liquid crystal polymer layer.

6. The sail of claim 1 which comprises adjacent, coextruded layers of a nylon polymer, a tie adhesive layer, a polycarbonate polymer layer, a tie adhesive layer and a nylon layer.

7. The sail of claim 1 which includes a symmetrical structure of polymer layers comprising a low density polyethylene layer, a nylon layer, a polycarbonate layer, a nylon layer and a low density polyethylene layer.

8. The sail of claim 1 wherein the sail comprises from two to nine coextruded layers.

9. The sail of claim 1 which includes coextruded adjacent layers of a low density polyethylene layer, a nylon layer, a tie adhesive layer and a polycarbonate layer.

10. The sail of claim 1 which includes adjacent coextruded layers of a nylon layer, a tie adhesive layer, a polycarbonate layer, a tie adhesive layer and a liquid crystal polymer layer.

11. The sail of claim 1 which includes adjacent coextruded layers of a nylon layer a polycarbonate layer, a tie adhesive layer and a liquid crystal polymer layer.

12. The sail of claim 1 which includes adjacent coextruded layers comprising a low density polyethylene layer, a tie adhesive layer, a nylon layer, a tie adhesive layer, a polycarbonate layer, a tie adhesive layer, a nylon layer, a tie adhesive layer and a low density polyethylene layer.

13. The sail of claim 1 wherein the thickness of the sail comprises from about 0.0005 to 0.015 inches.

14. The sail of claim 1 wherein the polymer layers are as thin as 0.00002 inches.

15. The sail of claim 1 wherein the polycarbonate-containing polymer layer comprises a mixture of a liquid crystal polymer and a polycarbonate in an amount of from about 40% to 70% by weight.

16. The sail of claim 1 wherein the liquid crystal polymers are selected from the group of polymers of para-oxybenzoyl and oxybiphenylene terephthaloyl copolymers and aromatic polyester polymers.

17. The sail of claim 1 which includes therein a layer of a thermoplastic extruded urethane polymer.

18. The sail of claim 1 wherein at least one of the polycarbonate polymer, polycarbonate-containing polymer and liquid crystal polymer layers are coextensive with the polyamide layer and includes a polyolefin-based adhesive tie layer between the coextensive layers.

19. The sail of claim 18 wherein the polyamide polymer layer comprises nylon 6/6.

20. The sail of claim 1 which includes a sail material of biaxially stretched, coextruded, distinct polymer layers of from about 0.0005 to 0.015 inches in thickness and the sail material having equivalent strength in all planar directions.

21. The sail of claim 20 wherein the sheets of sail material are of the same width and each of the sheets are joined together at the seams.

22. The sail of claim 1 composed of a sail material wherein the plurality of sheets of the sail material are composed of biaxially stretched, coextruded polymer layers.

* * * * *